June 7, 1949.　　　F. E. PAYNE　　　2,472,264

DOUBLE SEAL

Filed Dec. 22, 1945

INVENTOR.
Frank E. Payne
BY Charles P. Vajtech
Atty.

Patented June 7, 1949

2,472,264

UNITED STATES PATENT OFFICE 2,472,264

DOUBLE SEAL

Frank E. Payne, Glencoe, Ill., assignor to Crane Packing Company, Chicago, Ill., a corporation of Illinois Application December 22, 1945, Serial No. 636,954

5 Claims. (Cl. 286—11)

This invention relates to fluid seals for relatively rotatable structures and particularly to fluid seals which utilize flat sealing surfaces disposed in a plane which is normal to the axis of rotation of the rotatable structure or structures.

The principal object of this invention is to provide a double seal of the type described which is so constructed that the entire seal may be handled as a unit.

Another object of this invention is to provide a double seal in which the various elements thereof are united so as to form a single unit, all mounted within a gland which may be bolted to a housing or the like.

Another object of this invention is to provide a double seal which is comprised for the most part of elements interchangeable with a single seal, but which includes at least one element common to both seals so that the double seal is held together and functions as a unit.

A feature of this invention is the provision of a positioning means whereby the double seal, when installed in a gland or the like, may be properly positioned on a shaft with the load substantially the same on each portion of the double seal.

These and other objects and features of this invention will become apparent from the following detailed description when taken together with the accompanying drawings in which Fig. 1 is a cross-section through a double seal made in accordance with this invention;

Fig. 4 is a fragmentary section of a seal made in accordance with this invention showing the means for positioning the seal within a gland or the like.

Figure 1:
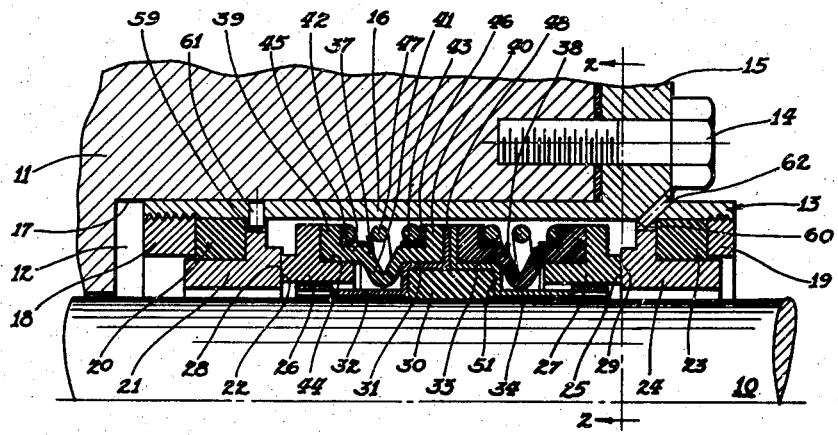

Referring now to Fig. 1 for a detailed description of the invention, there is shown a shaft 10 which rotates within a housing 11, said housing 11 being provided with a space 12, in which packing is generally placed to effect a seal between the shaft and housing. As shown in Fig. 1, however, instead of the usual packing, there is provided a gland 13 which is secured to housing 11 by means of bolts 14 passing through suitable apertures in the flange 15 thereof. Said gland is in the form of a sleeve 16 which fits closely within the surface 17 of the housing 11 defining space 12. The lefthand end (Fig. 1) of sleeve 16 is threaded internally to receive a threaded end ring 18 which partly closes off the space between sleeve 16 and shaft 10. A similar threaded end ring 19 is provided on the righthand (Fig. 1) end of gland 13 to partially close off this end of the gland. Said end ring 19 provides easy access to the interior of the gland should it become difficult to remove the gland from the housing because of an accumulation of rust, dirt, etc., in the gland.

Pressed into sleeve 16 and abutting ring 18 is a resilient compressible ring 20 made of rubber or the like, upon which is pressed in turn a hard annular sealing ring 21 having a substantially L-shaped radial cross-section. The vertical surface 22 of seat 21 is suitably finished off by grinding and lapping to provide one of the sealing surfaces of the sealing unit. At the opposite end and abutting flange 29 is a similar flexible, compressible ring 23 made of rubber or the like, against which is pressed a hard annular seal seat 24 which is likewise of L-shaped radial cross-section. The vertical face 25 of seal seat 24 is suitably finished off by grinding and lapping to provide another of the sealing surfaces of the sealing unit.

A washer 26 is positioned adjacent seal seat 21 and a similar washer 27 is positioned adjacent seal seat 24, washer 26 having a radial surface 28 which is suitably finished, preferably by lapping, to form the cooperating sealing surface for seal seat 21. Thus despite the fact that there is relative rotary movement between seal surfaces 22 and 28, there is nevertheless provided a fluid-tight joint between the surfaces due to the accuracy with which they are finished. Similarly washer 27 is provided with a surface 29 which bears against surface 25 of ring 24 and is likewise finished by grinding and lapping to form a fluid-tight seal between washer 27 and ring 24. It is contemplated that the material of which washers 26 and 27 are formed is such that the sealing surfaces on the washers will cooperate with the sealing surfaces on the seal seats without undue wear and without chattering.

Figure 2:
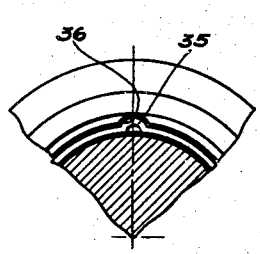
Fig. 2 is a fragmentary elevation of the seal of Fig. 1 taken along lines 2—2 of Fig. 1.

Located midway between seal seats 21 and 24 is a resilient compressible ring 30 which is compressed upon shaft 10 on one side by a recess 31 in a driving sleeve 32 and on the other side by a similar recess 33 in a driving sleeve 34. The driving sleeves 32 and 34 are preferably made of non-corroding materials such as brass, stainless steel or the like, and telescope within washers 26 and 27 respectively. As shown in Fig. 2, the said sleeves are provided with one or more driving lugs 35 which cooperate with corresponding notches 36 in the washers to provide a rotary driving, axially slidable connection between the washers and driving sleeves. Thus the washers may move freely axially on the driving sleeves, but are constrained by means of the lugs 35 and slots 36 to rotate with the sleeves. Inasmuch as the recesses 31 and 33 of each sleeve are compressed upon ring 30 which in turn is compressed upon shaft 10, it will be apparent that the sleeves 32 and 34 will be driven frictionally with shaft 10 and will therefore drive washers 26 and 27 with them.

A fluid-tight seal is effected between the washers and driving sleeves by means of identical tubular sealing elements indicated generally by the reference characters 37 and 38. It will be understood that tubular sealing element 38 is identical in every respect with tubular sealing element 37 and hence only the latter will be described in detail. Tubular sealing element 37 is disclosed in my co-pending application, Serial No. 573,163, filed January 17, 1945. It is made of rubber or the like and is comprised of spaced flanges 39 and 40, a central fold 41 and connecting cylindrical sections 42 and 43. The internal diameter of the connecting sections 42 and 43 is identical with that of the flanges 39 and 40. Sealing washer 26 is provided with a shoulder 44 upon which the cylindrical portion 42 of tubular sealing element 37 is compressed. A ferrule 45 is compressed upon the exterior of the cylindrical section 42 to insure a fluid-tight connection between washer 26 and the tubular sealing element. Similarly, the cylindrical section 43 of tubular sealing element 37 is pressed upon the recess-forming portion 31 of the driving sleeve 32, and a ferrule 46 is compressed upon the exterior of the cylindrical section 43 to insure a fluid-tight connection between the tubular sealing element and the driving sleeve. Since the driving sleeve 32 is compressed at the recessed portion 31 upon ring 30 and ring 30, in turn, is compressed upon shaft 10, there is thus formed a fluid-tight connection between the tubular sealing element 37 and shaft 10.

Fold 41 is expansible and contractible and hence will permit washer 26 and flange 39 to move axially relative to cylindrical portion 43 and its associated shaft 10. A spring 47 is interposed between ferrules 45 and 46 to insure a continuous pressure upon washer 26 in the direction of seal seat 21. It is desirable that driving sleeve 32 be interchangeable with the seal disclosed in the aforesaid prior application, and hence it is provided with a radially extending flange 48 which abuts the corresponding flange on driving sleeve 34.

Figure 3:
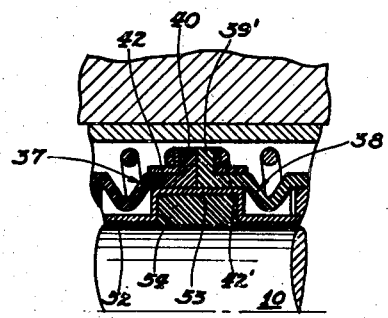
Fig. 3 is a fragmentary section of a modification of the seal of Fig. 1.
Figure 4:
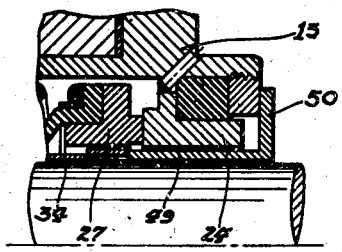

It is contemplated that the double seal and gland 13 may be removable as a single self-contained unit. When initially moved into place in housing 11, however, due to the fact that the resistance to movement created by the friction between ring 30 and shaft 10 may be greater than the pressure of springs 47, said ring 30 may not be in its proper mid-position between the seal seats 21 and 24 when gland 13 is bolted in place. To assure a proper location of the ring 30, a positioner such as that shown in Fig. 4 may be employed. Said positioner as shown in Fig. 4 is comprised of a flanged tube 49 having a flange 50 which is sufficiently large to permit it to abut the exterior of gland 13. The tube 49 passes between shaft 10 and seat 24 and strikes the right-hand edge (Fig. 1) of driving sleeve 34. The length of the tube 49 is so selected that ring 30 will be properly positioned between seats 21 and 24 when flange 50 abuts the exterior surface of gland 13. The movement of ring 30 along shaft 10 is assured by the radial shoulder 51 (Fig. 1) which connects the recess-forming portion 33 and the driving sleeve 34.

Where interchangeability between the driving sleeves of the seal herein disclosed and the seal disclosed in the aforementioned prior application is not desired, the modification shown in Fig. 3 may be employed. In this form a single tube or sleeve 52 replaces the two sleeves 32 and 34 of Fig. 1. Thus the sleeve 52 is provided with an enlarged central section 53 into which the ring 54 is inserted. Since ring 54 is resilient and compressible, it may be readily deformed so as to pass through the narrower section of the tube 52 prior to its entry into the enlarged portion. Said enlarged portion 53 is of the same outside diameter as the corresponding recessed portions 31 and 33 of Fig. 1 so that the cylindrical portions will be compressed upon the exterior of the enlarged portion to form a fluid-tight seal therewith. The flanges 40 and 39' of the tubular sealing elements 37 and 38 will be pressed together instead of against a radially extending flange such as 48 in Fig. 1. Inasmuch as a fluid-tight seal is formed between the cylindrical portions 43 and 42' and the enlarged section 53 of the driving sleeve 52, it is not essential to form a similar fluid-tight joint between flanges 40 and 39'.

Figure 5:
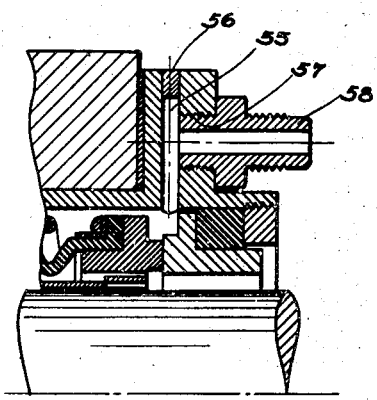

In both modifications, fluid under any desired pressure may be introduced into the gland by the means shown in Fig. 5. This means comprises one or more passages 55 which may be drilled radially into flange 15 in communication with the interior of gland 13 and then stopped with a plug 56. A side outlet 57 is drilled in flange 15 to connect with passage 55 and is tapped to receive a fitting 58. Said fitting is then connected to a source of lubricant (not shown) so that the entire gland may be filled and maintained at the proper pressure. Where two passages 55 are provided, one may be used as an inlet and the other as an outlet for a continuously circulated lubricant. This construction provides a lubricated double seal wherein the lubricating system is entirely independent of the housing.

Where the torque on the seal seats 21 and 24 is rather high, such that the seats have a tendency to turn relative to the rubber rings 20 and 23, the seats 21 and 24 are provided with peripheral notches 59 and 60 into which are projected pins 61 and 62, respectively, secured to gland 13.

It is understood that the foregoing description is merely illustrative of a preferred embodiment of the invention and that the scope of the invention therefore is not to be limited thereto but is to be determined by the following claims.

What is claimed is:

1. A seal device for effecting a seal between relatively rotatable structures, said seal comprising spaced seal seats on one structure, said seats having sealing surfaces facing one another, a resilient compressible sealing ring encircling the other structure, a tube located exteriorly of the ring and having its mid-portion compressed upon the ring, such that said ring is likewise compressed upon the other structure, said tube extending outward from the ring into proximity with the seal seats, sealing washers encircling the tube ends and each having a sealing surface contacting the sealing surface on the adjacent seal seat, an axially slidably rotary driving connection between the washers and tube, and flexible means effecting a fluid-tight seal between the washers and tube, said flexible means comprising expansible tubular elements having cylindrical regions near the ends thereof, means for compressing one region of each element upon the exterior of the tube, and means for compressing the other region of each element upon a washer.

2. A seal device for effecting a seal between relatively rotatable structures, said seal comprising a sleeve adapted to be secured to one structure, a resilient compressible ring located substantially midway between the ends of the sleeve, tubular means having an enlarged portion to receive the ring therein, said means extending axially outwardly from each side of the ring and being adapted to compress the ring upon the other structure so as to be rotatable therewith, seal seats mounted on the ends of the sleeve, sealing washers cooperating with the seal seats, axially slidable rotary driving connections between the washers and tubular means, and flexible bellows for effecting a seal between the washers and tubular means, said bellows having one end in sealing engagement with the washer and the other end in sealing engagement with the tubular means at the enlarged portion.

3. A seal device as described in claim 1, said tube having an enlarged portion located substantially midway between the ends thereof, and said compressible sealing ring being compressed between the enlarged portion and the rotatable structure.

4. A seal device as described in claim 1, said tube having an enlarged portion located substantially midway between the ends thereof, the said compressible sealing ring being compressed between the enlarged portion and the rotatable structure, and one cylindrical region on each expansible tubular element being compressed upon the enlarged portion of the tube.

5. A seal device for effecting a seal between relatively rotatable structures, said seal comprising spaced seal seats on one structure, said seats having sealing surfaces facing one another, a resilient compressible sealing ring encircling the other structure, a plurality of aligned tubes located exteriorly of the ring and having their adjacent ends enlarged to receive the ring and to compress the said ring upon the other structure, said tubes extending axially outwardly into proximity with the seal seats, sealing washers encircling the free tube ends and each washer having a sealing surface contacting the sealing surface on the adjacent seal seat, and an axially slidable rotary driving connection between the washers and tubes, said flexible means comprising expansible tubular elements having cylindrical regions near the ends thereof, means for compressing one region of each element upon the exterior of the tube, and means for compressing the other region of each element upon a washer.

FRANK E. PAYNE.

REFERENCES CITED

The following references are of record in the file of this patent:

UNITED STATES PATENTS

| Number | Name | Date |
|---|---|---|
| 1,826,212 | Gremminger | Oct. 6, 1931 |
| 1,862,887 | Durdin | June 14, 1932 |
| 1,898,278 | Weis | Feb. 21, 1933 |
| 2,306,417 | Wiessner | Dec. 29, 1942 |
| 2,365,351 | Matter | Dec. 19, 1944 |

FOREIGN PATENTS

| Number | Country | Date |
|---|---|---|
| 664,854 | France | 1929 |